United States Patent
Kerber et al.

(10) Patent No.: US 10,025,325 B2
(45) Date of Patent: Jul. 17, 2018

(54) PRESSURE-REGULATING VALVE HAVING AN ELECTRICAL CONTROL UNIT

(71) Applicant: Thomas Magnete GmbH, Herdorf (DE)

(72) Inventors: Josef Kerber, Goldbach (DE); Christan Becker, Neunkirchen (DE); Jorg Schneider, Reichshof (DE)

(73) Assignee: Thomas Magnete GmbH, Herdorf (DE)

( * ) Notice: Subject to any disclaimer, the term of this patent is extended or adjusted under 35 U.S.C. 154(b) by 295 days.

(21) Appl. No.: 14/227,213

(22) Filed: Mar. 27, 2014

(65) Prior Publication Data
US 2014/0290771 A1 Oct. 2, 2014

(30) Foreign Application Priority Data
Mar. 28, 2013 (DE) .................. 10 2013 005 478

(51) Int. Cl.
G05D 16/20 (2006.01)
F16K 31/06 (2006.01)
H01F 7/06 (2006.01)

(52) U.S. Cl.
CPC ....... *G05D 16/202* (2013.01); *F16K 31/0675* (2013.01); *H01F 7/064* (2013.01); *H01F 2007/062* (2013.01); *Y10T 137/86389* (2015.04)

(58) Field of Classification Search
CPC ... H01F 7/064; H01F 2007/062; G05D 16/02; Y10T 137/86389; F16K 31/0675
(Continued)

(56) References Cited

U.S. PATENT DOCUMENTS 4,368,759 A * 1/1983 Akagi ................ F16K 3/24
137/625.48
4,518,955 A * 5/1985 Meyer ................ F17D 5/02
137/460
(Continued)

FOREIGN PATENT DOCUMENTS

CN 102146939 A 8/2011
CN 102192353 A 9/2011
(Continued)

OTHER PUBLICATIONS

Steve Corrigan; Introduction to the Controller Area Network (CAN); Jul. 2008; Texas Instruments.*
(Continued)

*Primary Examiner* — Kevin Murphy
*Assistant Examiner* — Kelsey Cary
(74) *Attorney, Agent, or Firm* — Harness, Dickey & Pierce, P.L.C.

(57) ABSTRACT

A pressure-regulating valve having an electrical control unit mutually connected by a first plug connector. The electrical control unit controls the pressure-regulating valve using a regulated current signal and also renders possible the connection to at least one additional device. The electrical control unit includes two additional plug connectors. Electrical energy is supplied to the electrical control unit by way of a second plug connector and a signal-carrying connection is produced, by a data bus, to a higher-priority controller or to a set-point generator. A third plug connector connects the electrical control unit to one or several bus-compatible electrical devices, or connects the electrical control unit to an additional pressure-regulating valve without a dedicated electrical control unit. The system can be used in electrohydraulic feedforward controllers of direction-control
(Continued)

valves, variable hydraulic pumps and variable hydraulic motors, and in vehicular work machines.

14 Claims, 3 Drawing Sheets

(58) Field of Classification Search
USPC .................................. 137/625.64, 487.5, 884
See application file for complete search history.

(56) References Cited

U.S. PATENT DOCUMENTS

| | | | | |
|---|---|---|---|---|
| 5,443,093 | A | * | 8/1995 | Stoll ........................ F15B 13/00 137/596.17 |
| 5,500,882 | A | * | 3/1996 | Eifert ..................... G01F 1/7046 137/554 |
| 5,954,089 | A | * | 9/1999 | Seymour ............. F16K 31/0675 137/487.5 |
| 2003/0189183 | A1 | * | 10/2003 | Noller ................ F02M 51/0614 251/129.21 |
| 2011/0214742 | A1 | * | 9/2011 | Izutani ................. G05D 7/0647 137/1 |
| 2013/0152673 | A1 | * | 6/2013 | Young ..................... F23N 1/002 73/40.7 |

FOREIGN PATENT DOCUMENTS

| | | |
|---|---|---|
| DE | 102008012692 A1 | 9/2008 |
| DE | 102009029764 A1 | 12/2010 |
| DE | 102011122363 A1 | 6/2013 |
| DE | 102013005478 B3 | 1/2014 |
| EP | 2110560 A2 | 10/2009 |
| FR | 2713385 A1 | 6/1995 |

OTHER PUBLICATIONS

Chinese Office Action dated Oct. 9, 2015 for corresponding Chinese Application No. 201410065423.1 (English translation).
German Office Action dated Nov. 7, 2013 for corresponding German Application No. DE 10 2013 005 478 filed Mar. 28, 2013.

* cited by examiner

PRESSURE-REGULATING VALVE HAVING AN ELECTRICAL CONTROL UNIT

CROSS-REFERENCE TO RELATED APPLICATIONS

This application claims the benefit and priority of German Patent Application No. DE 10 2013 005 478 filed on Mar. 28, 2013. The entire disclosure of the above application is incorporated herein by reference.

FIELD

The present disclosure relates to a pressure-regulating valve having an electrical control unit.

BACKGROUND

This section provides background information related to the present disclosure which is not necessarily prior art.

Electrical control units for hydraulic valves that are to be fastened and connected to the valve by means of a plug connector are known for example from the protective right DE 10 2009 029 764 A1, in addition the protective right DE 10 2011 122 363 A1 discloses an electrical control unit in a plug device.

SUMMARY

This section provides a general summary of the disclosure, and is not a comprehensive disclosure of its full scope or all of its features.

The present disclosure renders it possible to use a pluggable, electrical control unit for the purpose of supplying two electromagnets and consequently to render it possible to reduce the costs of the entire device. Alternatively, the same electrical control unit renders possible the forwarding of electrical signals and the supply of energy to additional electrical devices and consequently reduce the outlay for the cabling.

By virtue of the fact that the electrical control unit is equipped with three plug connectors and with suitable hardware and software, the electrical control unit can control two pressure-regulating valves, one valve to which said electrical control unit is connected mechanically and by way of a plug connector without a cable, and an additional valve to which said electrical control unit is connected by way of a cable.

These two pressure-regulating valves are generally used jointly to control a direction-control valve or a variable displacement pump. For this purpose, a higher-priority controller or a signal generator provides a common digital signal by way of a data bus to the electrical control unit.

An improvement of the described arrangement resides in the fact that without changing its circuitry the electrical control unit can also be used in a different configuration merely by means of different programming, in particular with the forwarding of control signals and with the supply of electrical energy to a different electrical device. Said electrical device can also comprise one or several sensors that send feedback signals regarding the status of the controlled system back to the higher-priority controller. It is consequently possible also to construct closed control loops and monitored control units.

The described arrangement comprising a pressure-regulating valve and an electrical control unit can also be used in electro-hydraulic feedforward controllers of direction-control valves, variable hydraulic pumps and variable hydraulic motors, and in vehicular work machines.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
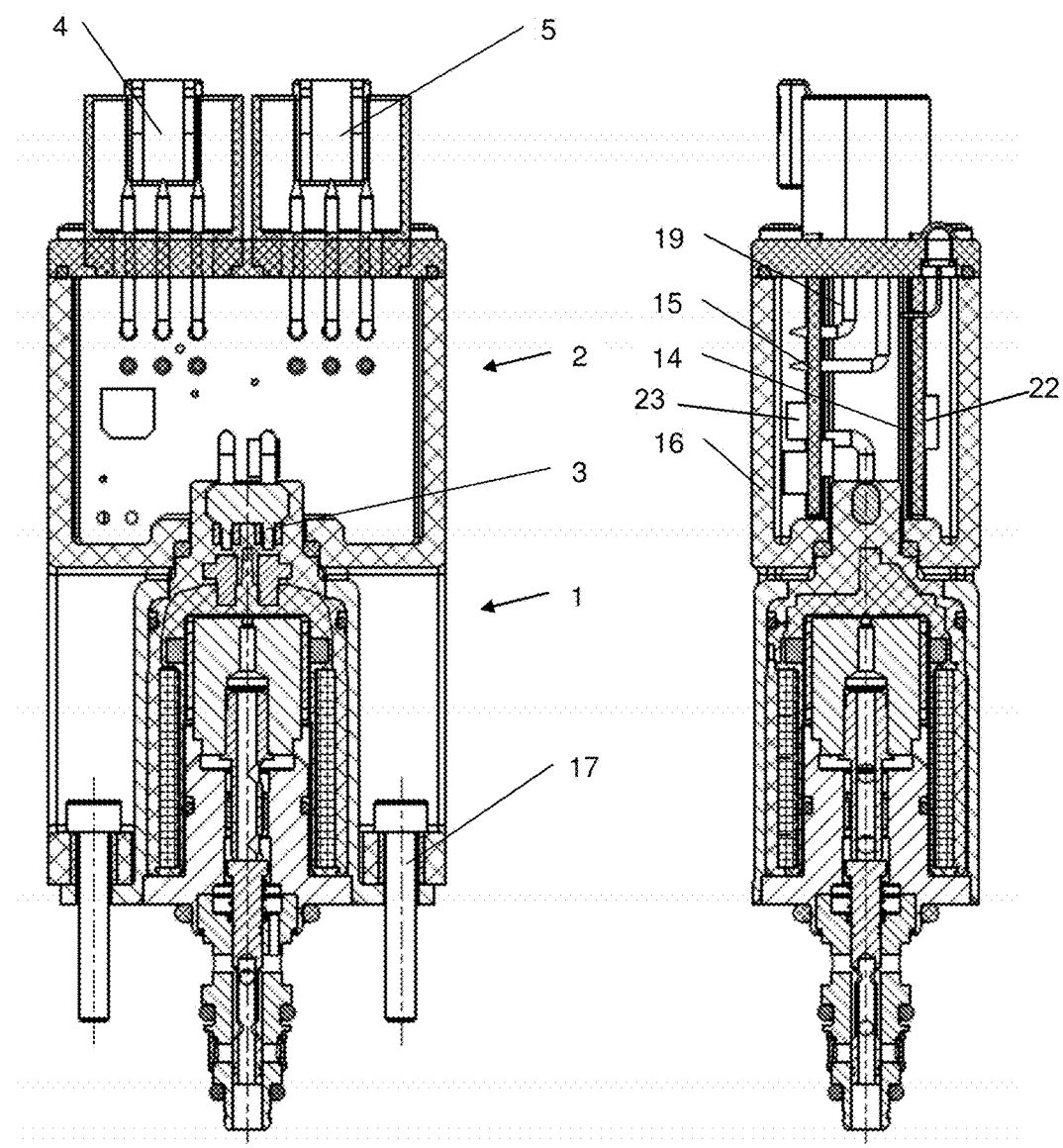
FIG. 1 illustrates the pressure-regulating valve having an electrical control unit.

A pressure-regulating valve 1, is illustrated in FIG. 1, connected to an electrical control unit 2 by means of a first plug connector 3, wherein the electrical control unit 2 controls the pressure-regulating valve 1 using a regulated current signal.

Figure 2:
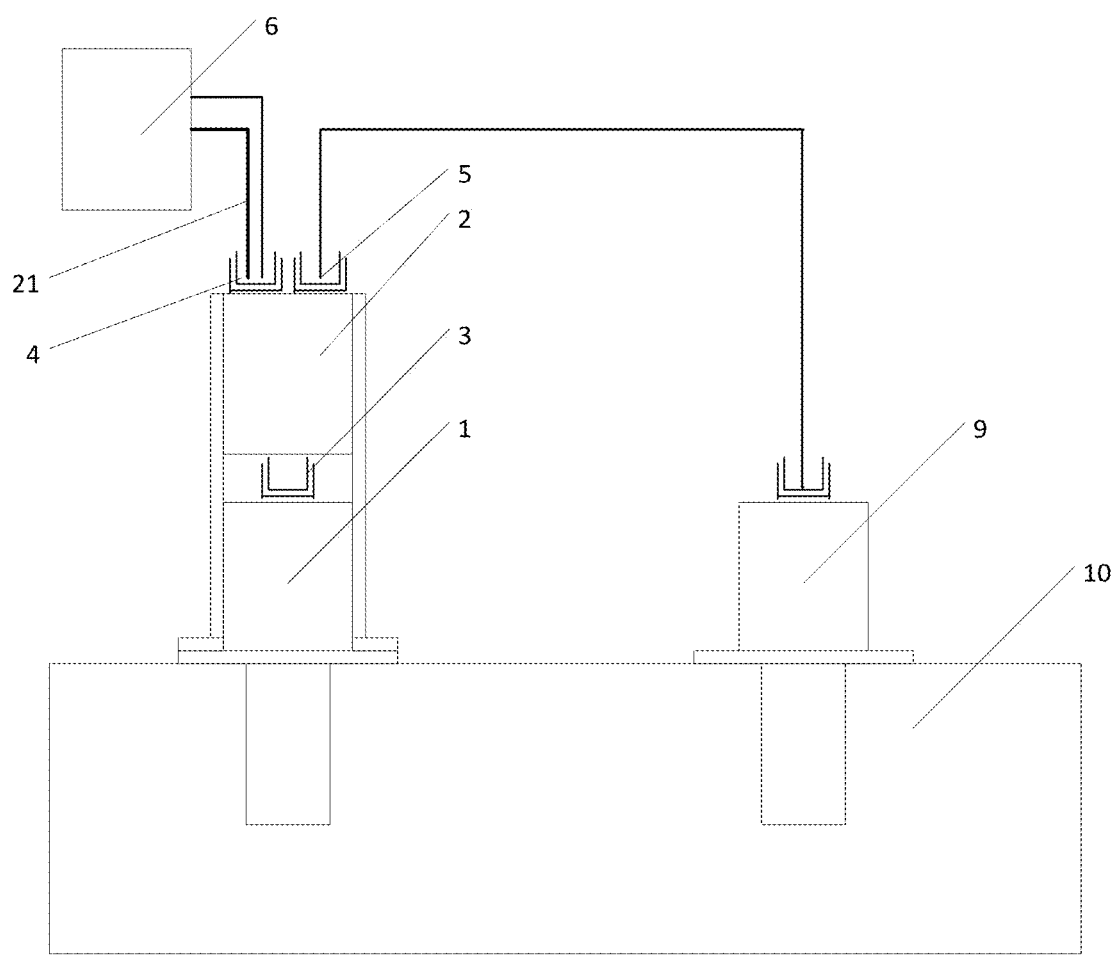
FIG. 2 illustrates an arrangement of two pressure-regulating valves and one electrical control unit.
Figure 3:
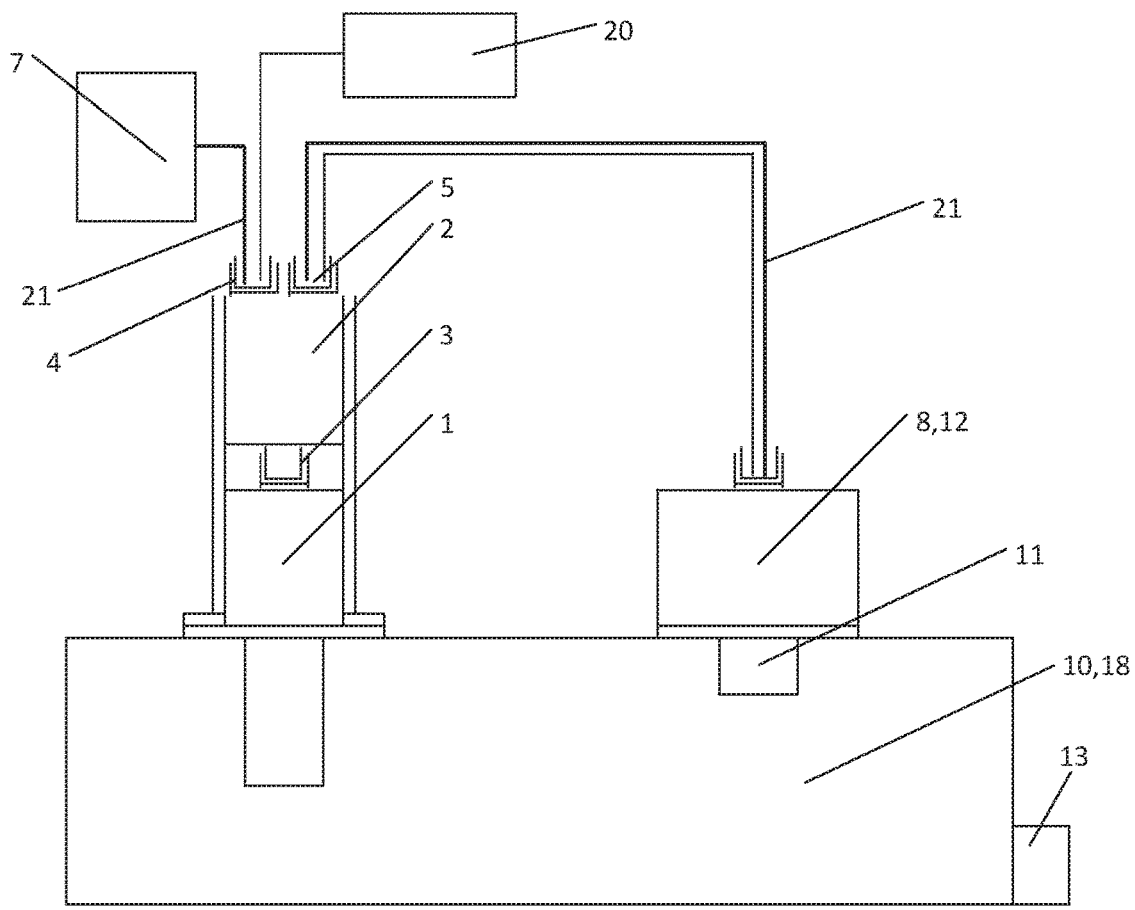
FIG. 3 illustrates a system having a pressure-regulating valve, an electrical control unit and an additional electrical device.

The electrical control unit 2 comprises two additional plug connectors 4 and 5, the electrical control unit 2 is supplied with electrical energy 20 by way of a second plug connector 4 and a signal-carrying connection is produced, preferably by means of a data bus 21, to a higher-priority controller 6 or to a set-point generator 7, as shown in FIG. 2 and FIG. 3, respectively.

A third plug connector 5 connects the electrical control unit 2 to one or several bus-compatible electrical devices 8 or to an additional pressure-regulating valve 9 without a dedicated electrical control unit, as shown in FIG. 2 and FIG. 3, respectively. Wherein the bus-compatible electrical device 8 may be a pressure regulating valve 9.

The electrical control unit 2 is equipped and programmed so that it can as necessary control a second pressure-regulating valve 9 (see FIG. 2) using a regulated current signal.

It is preferred that the pressure-regulating valves 1 and 9 that are connected to the electrical control unit 2 jointly control in a feedforward manner a direction-control valve 10, as illustrated in FIG. 2.

Alternatively, the electrical control unit 2 is equipped and programmed so that the third plug connector 5 forwards both the signals, which are received by way of the first plug connector 3, and also the electrical energy for additional devices.

The signal-carrying connection 21 to the higher-priority controller 6 is advantageously embodied as a CAN bus 21 by way of the second plug connector 4 and the forwarding is also performed by way of the third plug connector 5 as a CAN bus 21.

Alternatively, a set-point generator 7 is connected by way of the second plug connector 4 and a CAN bus 21 and the forwarding is also performed by way of the third plug connector 5 as a CAN bus 21, wherein electrical energy 20 is also supplied by way of the second plug connector 4 to the electrical control unit 2, to the set-point generator 7 and as necessary to additional CAN bus-compatible connecting devices.

In a further development of the disclosure, as illustrated in FIG. 3, a CAN bus-compatible electrical device 8 is connected by way of the third plug connector 5, which device is for example an additional electrical control unit for an additional pressure-regulating valve, or a CAN bus-compatible electrical device that comprises a sensor 11 that monitors the pressure-regulating valve 1 or monitors the direction-control valve 10 that is controlled in a feedforward manner by the pressure-regulating valve 1.

In a different further development of the disclosure, a CAN bus-compatible electrical device 8 is connected by way of the third plug connector 5, which device comprises an electrical monitoring device 12 that, by means of one sensor or several sensors 11, monitors a machine 13 that is influenced by the direction-control valve 10 that is controlled in a feedforward manner.

The second plug connector 4 and the third plug connector 5 comprise in each case six contacts: four of each six contacts being used for the CAN bus 21, and in the case of the second plug connector 4, two for the supply of electrical energy 20, and in the case of the third plug connector 5, two either for the supply of electrical energy to additional devices or for the transmission of current signals to an electromagnetic actuator for a second pressure-regulating valve 9.

The electrical control unit 2 is embodied with two printed circuit boards 14 and 15, of which one comprises a micro-controller 22 and another comprises the electronic switches 23 for higher electrical currents.

The plug contacts 19 of the plug connectors 3, 4 and 5 are connected by means of soldering to the printed circuit board 15 that also comprises the electronic switches 23.

The electrical control unit 2 is received in a housing 16 that comprises on the side the pressure-regulating valve 1, and is fastened together with said pressure-regulating valve 1 by means of fastening screws 17 to a device 18.

LIST OF REFERENCE NUMERALS

1. Pressure-regulating valve
2. Electrical control unit
3. First plug connector
4. Second plug connector
5. Third plug connector
6. Higher-priority controller
7. Set-point generator
8. Electrical device
9. Second pressure-regulating valve
10. Direction-control valve
11. Sensor
12. Monitoring device
13. Machine
14. First printed circuit board
15. Second printed circuit board
16. Housing
17. Fastening screw
18. Device
19. Plug contact
20. Electrical energy supply
21. CAN bus
22. Micro-controller
23. Electronic switch The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A pressure-regulating valve having an electrical control unit, comprising:
the pressure-regulating valve and the electrical control unit being mutually and directly mechanically connected by a first plug connector configured to be directly fastened together without a transmission cable, wherein the electrical control unit controls the pressure-regulating valve by a micro-controller and by at least one electronic switch using a regulated current signal;
the electrical control unit includes the micro-controller, the at least one electronic switch, a second plug connector and a third plug connector;
wherein electrical energy is supplied to the electrical control unit by way of the second plug connector and a signal-carrying connection is produced to a remote higher-priority controller or to a set-point generator; and
wherein the third plug connector connects the electrical control unit to (i) at least one remote bus-compatible electrical devices or (ii) a second remote pressure-regulating valve without a dedicated electrical control unit;
wherein the electrical control unit, forwards signals and also the electrical energy by way of the third plug connector to control (i) the second remote pressure-regulating valve by the micro-controller and by at least one additional electronic switch using the regulated current signal or (ii) the at least one remote bus-compatible electrical devices;
wherein the electrical control unit includes two printed circuit boards, of which one comprises the micro-controller and another comprises the electronic switches for higher electrical currents.

2. The pressure-regulating valve having the electrical control unit according to claim 1, wherein the pressure-regulating valve and the second remote pressure-regulating valve that are connected to the electrical control unit jointly control a direction-control valve in feedforward manner.

3. The pressure-regulating valve having the electrical control unit according to claim 1, wherein the second plug connector and the third plug connector comprise in each case six contacts: four of each six contacts being used for a CAN bus, and in the case of the second plug connector, two for supply of electrical energy, and in the case of the third plug connector, two either for supply of electrical energy to additional devices or for transmission of current signals to an electromagnetic actuator for the second pressure-regulating valve.

4. The pressure-regulating valve having an electrical control unit according to claim 1, wherein plug contacts of the first, second, and third plug connectors are connected by soldering to the printed circuit board that also comprises the electronic switches.

5. The pressure-regulating valve having the electrical control unit according to claim 1, wherein the electrical control unit is received in a housing that comprises on the side the pressure-regulating valve, and is fastened together with the pressure-regulating valve by fastening screws to a device.

6. The pressure-regulating valve having the electrical control unit according to claim 1, wherein the signal-carrying connection to the higher-priority controller is embodied as a CAN bus by way of the second plug connector and the forwarding of the signals is also performed by way of the third plug connector as a CAN bus.

7. The pressure-regulating valve having the electrical control unit according to claim 6, wherein the at least one remote bus-compatible electrical device is connected by way of the third plug connector to the CAN bus.

8. The pressure-regulating valve having the electrical control unit according to claim 6, wherein the at least one remote bus-compatible electrical device is connected by way of the third plug connector, which the at least one remote bus-compatible electrical device comprises a sensor that monitors the pressure-regulating valve or monitors a direction-control valve that is controlled in feedforward manner by the pressure-regulating valve.

9. The pressure-regulating valve having the electrical control unit according to claim 1, wherein the signal-carrying connection to a set-point generator is embodied as a CAN bus by way of the second plug connector and the forwarding is also performed by way of the third plug connector as a CAN bus, wherein electrical energy is also supplied at least to the electrical control unit and to the set-point generator by way of the second plug connector.

10. The pressure-regulating valve having the electrical control unit according to claim 9, wherein the at least one remote bus-compatible electrical device is connected by way of the third plug connector to the CAN bus.

11. The pressure-regulating valve having the electrical control unit according to claim 9, wherein the at least one remote bus-compatible electrical device is connected by way of the third plug connector, which the at least one remote bus-compatible electrical device comprises a sensor that monitors the pressure-regulating valve or monitors a direction-control valve that is controlled in a feedforward manner by the pressure-regulating valve.

12. The pressure-regulating valve having the electrical control unit according to claim 9, wherein the at least one remote bus-compatible electrical device is connected by way of the third plug connector, which the at least one remote bus-compatible electrical device comprises an electrical monitoring device that by means of a sensor or several sensors monitors a machine that is influenced by a direction-control valve that is controlled in a feedforward manner.

13. A pressure-regulating valve system having an electrical control unit, comprising:
   the electrical control unit having a micro-controller and at least one electronic switch;
   the electrical control unit having a first plug connector, a second plug connector, and a third plug connector;
   a first pressure-regulating valve directly mechanically connected to the electrical control unit by way of the first plug connector configured to be directly fastened together without a transmission cable;
   a second remote pressure-regulating valve connected to the electrical control unit by way of the third plug connector and a transmission cable;
   a direction-control valve jointly controlled by the first and second pressure-regulating valves;
   wherein electrical energy is supplied to the electrical control unit by way of the second plug connector and a signal-carrying connection is produced to a remote higher-priority controller;
   wherein the first pressure-regulating valve is controlled by the micro-controller and by at least the one electronic switch using a regulated current signal;
   wherein the second remote pressure-regulating valve is controlled by the electrical control without a dedicated electrical control unit and powered by the electrical energy supplied by way of the third plug connector connected to the second remote pressure-regulating valve; and
   wherein upon controlling the first and second pressure-regulating valves by the electrical control unit, the direction-control valve is controlled in a feed forward manner.

14. The pressure-regulating valve system of claim 13, wherein the electrical control unit includes a first printed circuit board housing the micro-controller and a second printed circuit board housing the at least one electronic switch and the first plug connector, the second plug connector, and the third plug connector.

* * * * *